UNITED STATES PATENT OFFICE.

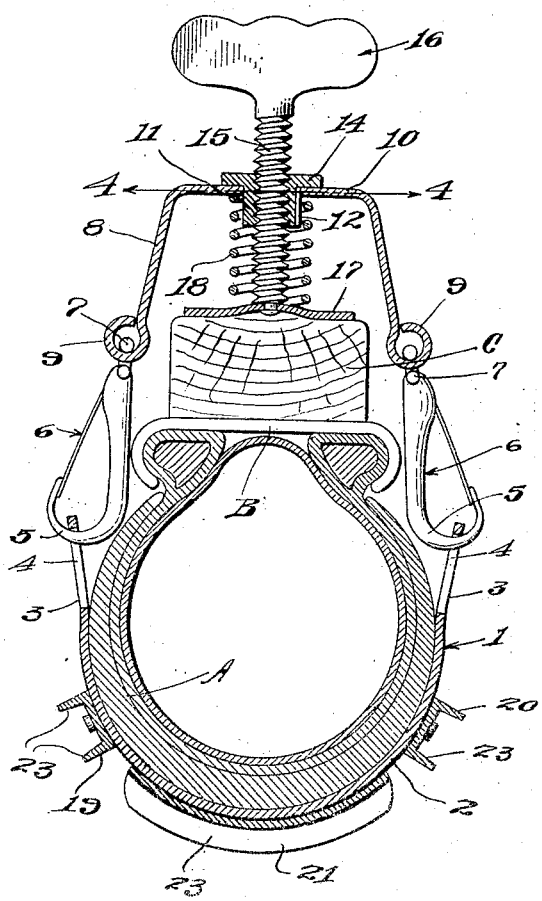
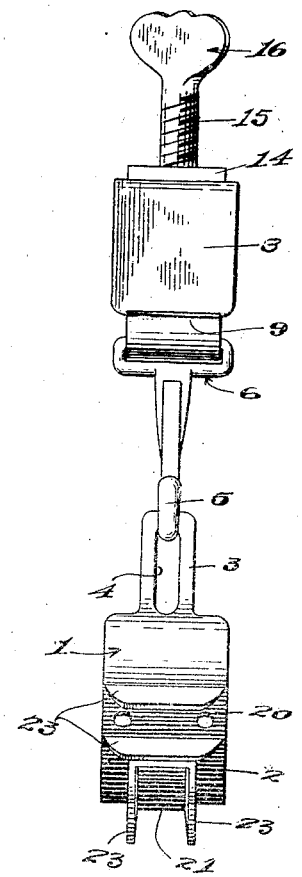
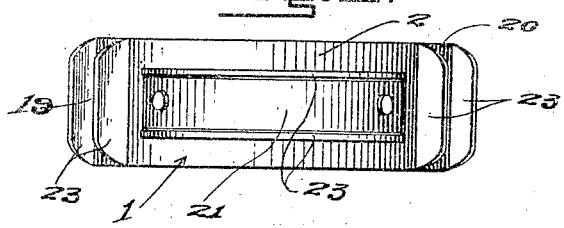
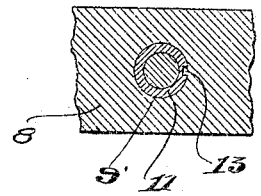

WATSON E. TUBBS, OF MILWAUKEE, WISCONSIN.

ANTISKIDDING DEVICE.

1,383,261.  Specification of Letters Patent.  Patented June 28, 1921.

Application filed August 27, 1918. Serial No. 251,686.

*To all whom it may concern:*

Be it known that I, WATSON E. TUBBS, a citizen of the United States, and a resident of Milwaukee, in the county of Milwaukee and State of Wisconsin, have invented certain new and useful Improvements in Antiskidding Devices, of which the following is a specification.

This invention relates to an anti-skidding device particularly designed for use upon motor vehicle wheels employing the ordinary type of pneumatic or cushioning tire and an object of the invention is to provide an anti-skid device which may be quickly and conveniently attached to or detached from connection with the wheel structure, to prevent both circumferential and lateral skidding of the wheel upon which the device is mounted.

Another object of this invention is to provide an attaching structure for attaching or connecting the anti-skid device to the felly of a wheel structure by means of a flexible yieldable clamp structure, so as to facilitate the mounting upon and removal from a tire of the tire engaging saddle which carries a plurality of outwardly extending traction cleats.

A still further object of the invention is to provide, in an anti-skidding device, a saddle for engagement with the tread portion of a tire, upon the outer surface of which are mounted a plurality of cleats that are substantially U-shaped in cross section, the said cleats being disposed in opposite relation, so as to prevent circumferential and lateral skidding of the wheel upon which the device is mounted.

Other objects of the invention will appear in the following detailed description, taken in connection with the accompanying drawing, forming a part of this specification, and in which drawing:

Figure 1 is a sectional view through the improved anti-skid device showing the same applied to a fragment of a wheel.

Fig. 2 is a side elevation of the anti-skid device.

Fig. 3 is a plan view of the saddle, and

Fig. 4 is a fragmentary section on the line 4—4 of Fig. 1.

Referring more particularly to the drawing, A indicates an ordinary pneumatic tire, which is carried by the wheel rim structure B, embodying the felly C, as is ordinary in the construction of motor vehicle wheels.

The anti-skidding device, which is indicated by the numeral 1 comprises an arcuate saddle or supporting plate 2, which is curved to snugly fit about a portion of the tread surface of the tire A and which has a pair of tongues 3 formed upon its ends and angling outwardly or tangentially from the transverse curvature of the tire A. The tongues 3 are provided with elongated openings or slots 4 extending longitudinally therein. The slots 4 are adapted to receive the hooks 5 of snap hook structures 6, for connecting the saddle to the snap hook structure, and by means of which snap hook structures, the saddle is connected, through the medium of links 7 to a yoke 8. The yoke 8 is preferably constructed of sheet metal in the shape of an inverted U and it has its ends rolled to form eyes 9 through which the links 7 engage. The inner bight portion 10 of the yoke 8 is provided with a centrally disposed opening 9' through which a collar 11 extends. The collar 11 is provided with a keyway 12, in which is seated a lug 13 formed upon the bight portion 10 of the yoke 8, for holding the collar against rotary movement with respect to the yoke. The collar 11 has a polygonal flange 14 formed upon its inner end and it is also provided with a screw-threaded centrally disposed bore. The threaded shank 15 of a thumb screw structure 16 extends threadably through the bore of the collar 11 and it has a clamping plate 17 swivelly connected to its outer end. The clamping plate 17 is shaped to snugly fit against the inner circumference of the felly C of the wheel rim structure B and by adjustment of the thumb screw, the saddle or supporting plate 2 of the anti-skid device may be drawn into firm binding engagement with portions of the tread portion of the tire A. The collar is slidably mounted within the opening formed centrally within the bight portion 10, and a spiral spring 18 is positioned between the facing surfaces of the bight portion 10 and the clamping plate 17 for yieldably holding the clamping plate in engagement with the inner circumference of the felly C and in such manner as to permit limited rocking movement of the yoke 8.

The saddle or supporting plate 2 has a plurality of cleats attached to its outer surface, by means of rivets or analogous fastening devices, the inner ends of which are flush with the inner surface of the saddle so as to prevent mutilation of the tire A.

The cleats 19 and 20 extend transversely of the saddle 2, while the cleat 21 extends longitudinally thereof. The cleats 19, 20 and 21 are substantially U-shaped in cross section, each presenting a pair of outwardly extending flanges 23 for rooting or biting into the surface over which the wheel may be traveling to prevent either lateral or circumferential skidding movement of the wheel. The cleats 19 and 20 are provided to prevent forward or lateral skidding of the wheel while the cleat 21 will prevent circumferential skidding thereof.

By loosening the clamping action between the plate 17 and the felly C, and disconnecting the snap hooks and tongues 3, the saddle may be easily and quickly disconnected from the clamp structure embodying the yoke 8, snap hooks 6, and screw 15 to permit of the detachment or removal of the anti-skidding device from upon a vehicle wheel.

Changes in details may be made without departing from the spirit of this invention; but,

I claim:

1. In an anti-skid device, the combination with a vehicle tire, and a vehicle wheel, of a device transversely surrounding the tire and wheel felly, a spring interposed between the felly and tire surrounding device for resiliently maintaining said tire surrounding device in gripping engagement with the crown of the tire, and means for adjusting the spring to vary the gripping engagement of the tire surrounding device upon the tire.

2. In an anti-skidding device, the combination, of a saddle plate adapted to fit the tread surface of an ordinary pneumatic tire, cleats carried by said saddle plate, a yoke, a flanged collar carried by said yoke, means for preventing rotation of the collar with respect to the yoke, a clamping screw extending adjustably through said collar, a clamping plate swively connected to the outer end of said clamping screw, a spring coiled about said clamping screw and having one end engaging said clamping plate and the other end engaging said yoke, and articulated means establishing a flexible connection between said saddle plate and yoke.

3. In an anti-skid device, the combination of a cleated saddle for fitting about the tread of a pneumatic tire, a substantially U-shaped yoke having its ends rolled to form eyes, articulated means connected to said rolled ends and to said saddle, a flanged collar extending to the bight portion of said yoke and provided with a keyway, a tongue formed upon the yoke and engaging in said keyway to prevent rotation of the collar relative to the yoke, an adjusting screw threaded through said collar, and a clamping plate swively carried by the inner end of said adjusting screw for clamping engagement with a wheel felly.

WATSON E. TUBBS.